United States Patent [19]
White

[11] Patent Number: 5,261,510
[45] Date of Patent: Nov. 16, 1993

[54] BRAKE SPRING SUPPORT PIN WITH SPRING CAM

[75] Inventor: Jay D. White, Galesburg, Mich.

[73] Assignee: Eaton Corporation, Cleveland, Ohio

[21] Appl. No.: 933,835

[22] Filed: Aug. 24, 1992

[51] Int. Cl.⁵ .............................................. F16D 51/22
[52] U.S. Cl. ..................................................... 188/216
[58] Field of Search ................ 267/179; 188/327, 328, 188/329, 330, 250 G, 250 C, 216

[56] References Cited

U.S. PATENT DOCUMENTS

| | | | |
|---|---|---|---|
| 1,840,032 | 1/1932 | Greenwood | 188/250 G X |
| 3,016,990 | 1/1962 | Towns | 188/216 X |
| 3,572,476 | 3/1971 | Laverdant | 188/216 |
| 4,471,859 | 9/1984 | Urban | 188/216 |

FOREIGN PATENT DOCUMENTS

| | | | |
|---|---|---|---|
| 165921 | 10/1949 | Austria | 188/216 |
| 555581 | 8/1943 | United Kingdom | 188/216 |

Primary Examiner—Robert J. Oberleitner
Assistant Examiner—Kevin D. Rutherford
Attorney, Agent, or Firm—L. H. Uthoff

[57] ABSTRACT

A brake retention pin rotatively mounted in a brake shoe having a spring cam portion secured to the brake retention pin where the spring cam engages a brake return spring hook as the brake retention pin is rotated thereby extending and translating the return spring for engagement with the retention pin.

8 Claims, 3 Drawing Sheets

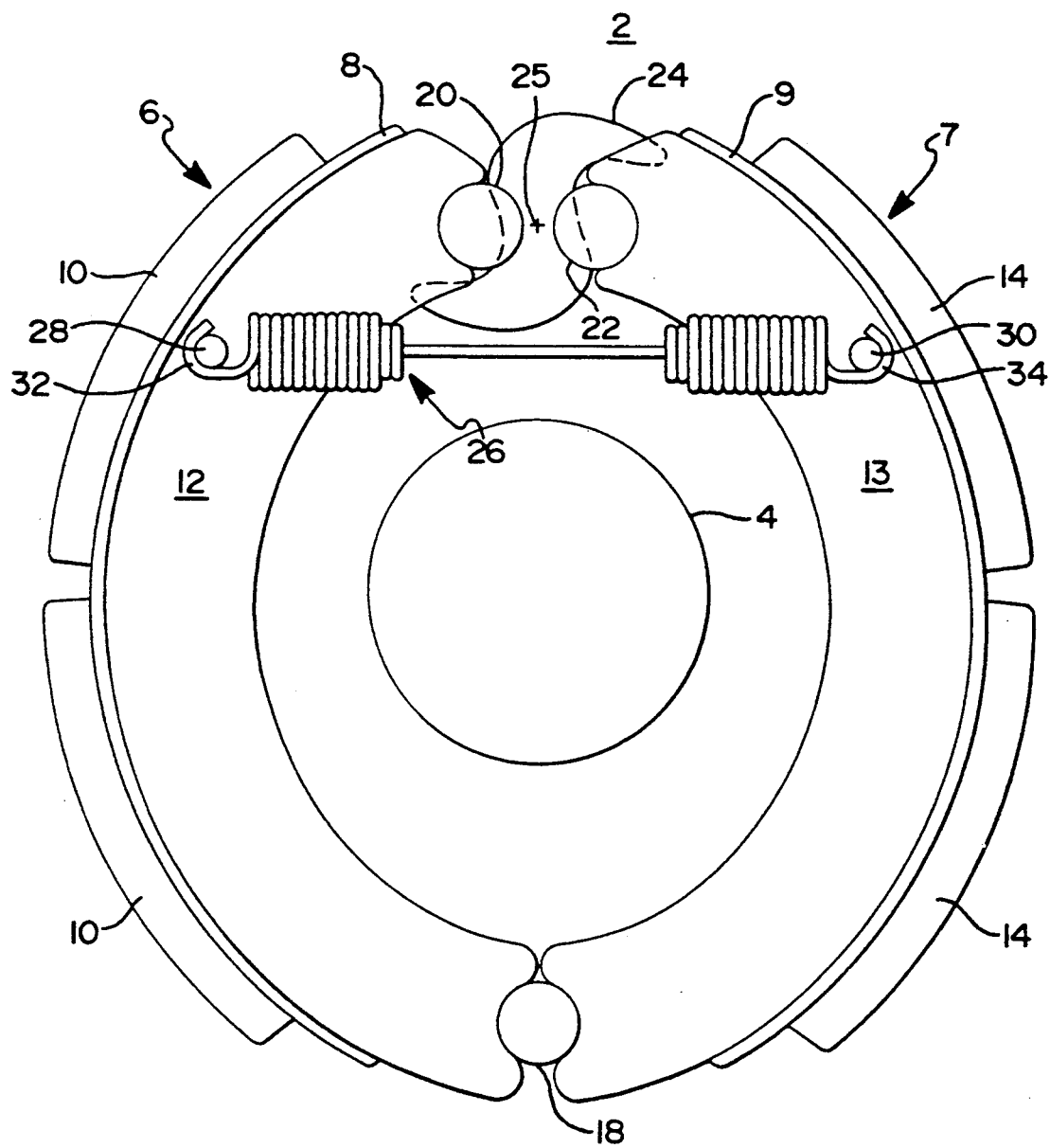

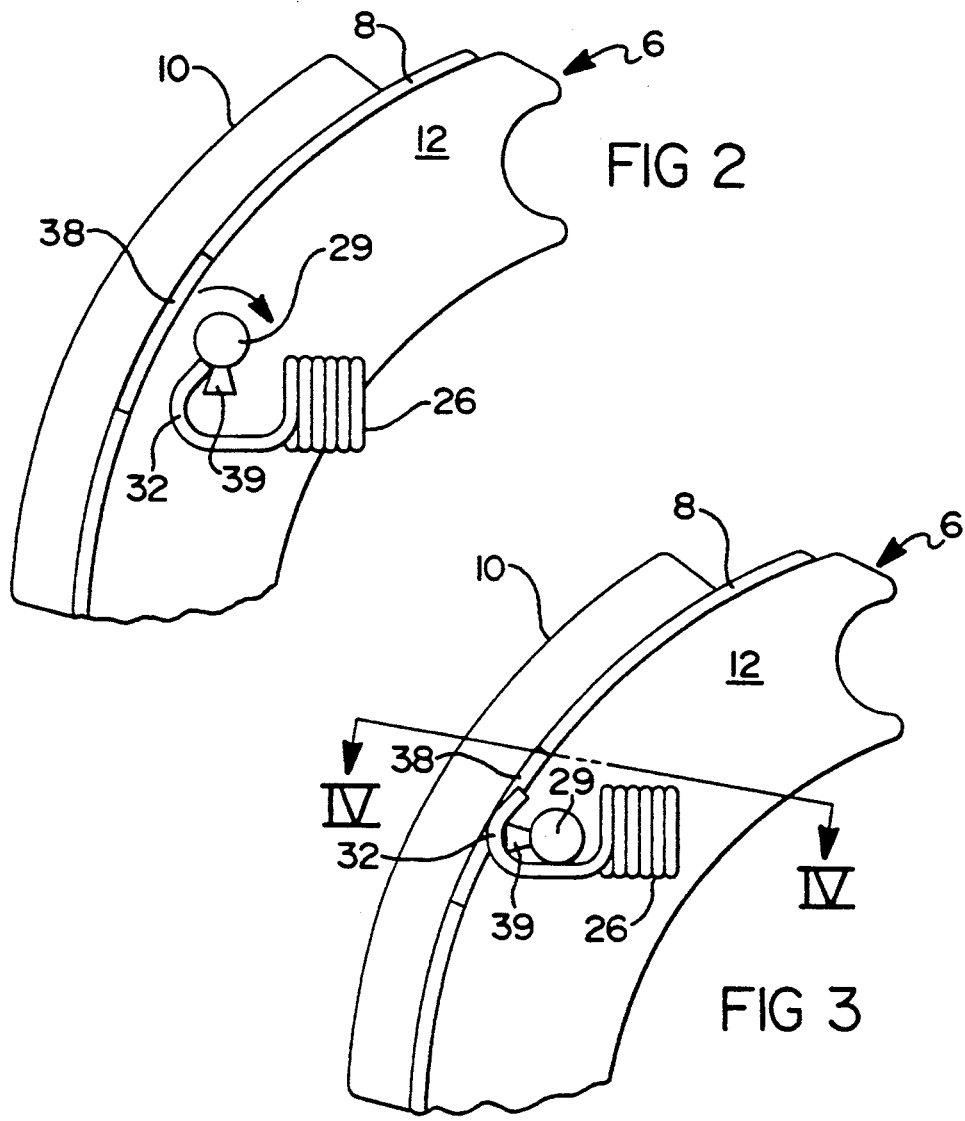
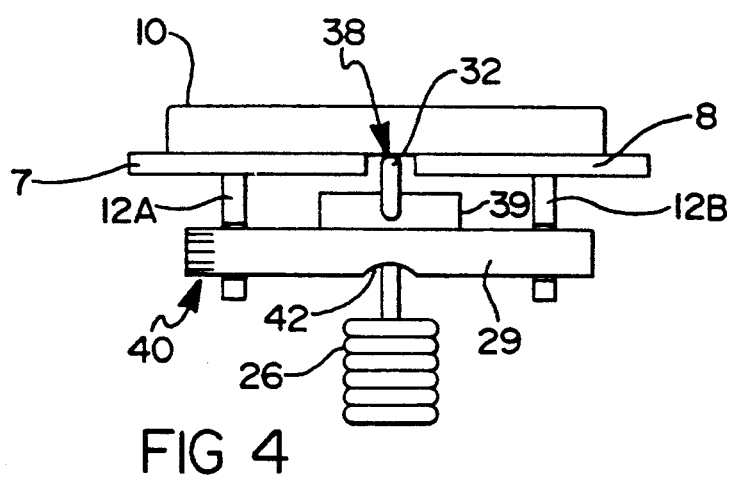

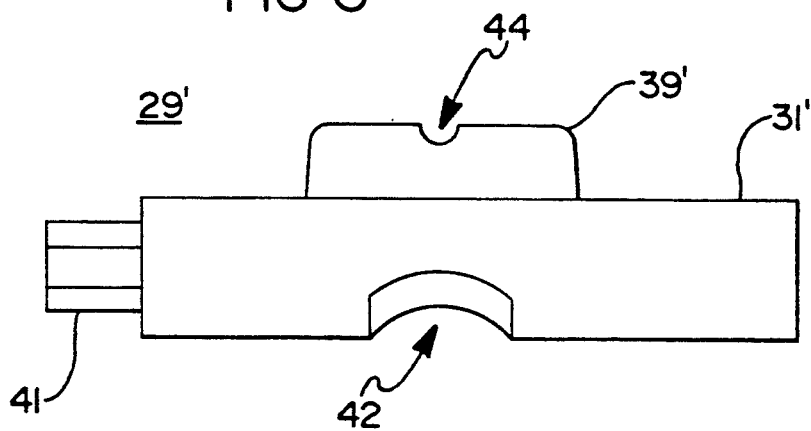
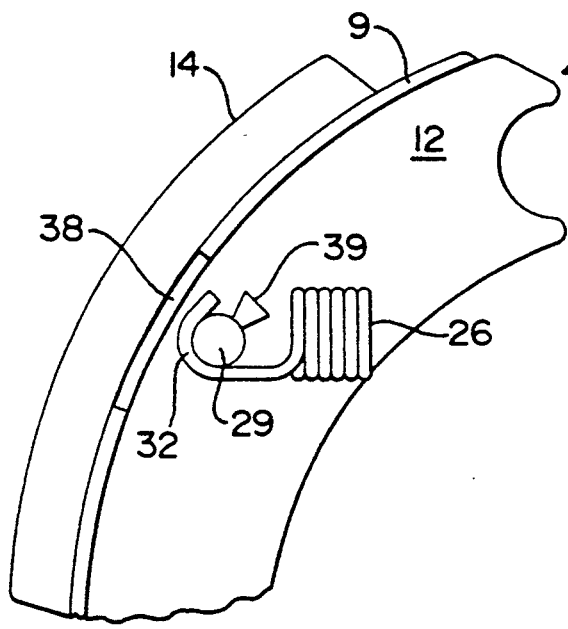
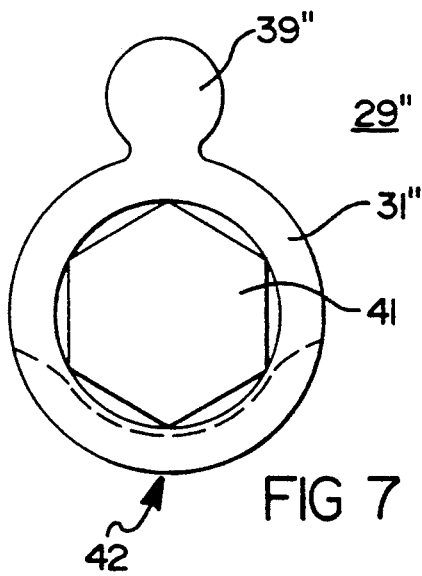

BRAKE SPRING SUPPORT PIN WITH SPRING CAM

RELATED APPLICATIONS

This application is related to application U.S. Ser. No. 07/799,816 entitled "Reduced Diameter Truck Brake System" filed on Nov. 29, 1991 and assigned to the same assignee, Eaton Corporation, as this application.

FIELD OF THE INVENTION

This invention relates to a brake spring support pin. More specifically, this invention relates to a brake spring support pin having a cam portion which radially extends from the outside diameter of the pin so as to engage the spring hook providing for ease of assembly.

Description of the Prior Art

Prior art brake systems have been designed to utilize a brake return spring which serves to force a leading and a lagging brake shoe toward the centroid of a vehicle axle thereby providing for clearance between the brake shoes and the inside of a brake drum. Traditionally, due to the design and geometric limitations of the wheel and the brake, there has been ample clearance between the brake return spring support pin and the inside face of the brake shoe to allow for easy assembly of the brake unit and specifically, of the loading of the brake spring hook onto the spring support pin. Brake spring pliers and/or some other type of common mechanical tool is commonly used to extend spring and slip the spring hook onto the spring support pin.

To increase the load capacity of a truck trailer, it is desirable to increase the overall height of the trailer by lowering the position of the axles which in turn require that a smaller diameter tire be utilized. Smaller tire in turn requires a reduced diameter wheel which restricts the overall diameter of the brake drum, hence, the outer diameter of the brake shoe assemblies. This compact design necessitates that the brake return spring be limited in overall length such that it becomes difficult to obtain the necessary constricting force between the brake shoes introduced by the spring and concurrently allow for the required range of motion of the shoes as they are expanded to contact the inner surface of the brake drum. To facilitate the fitting of a return spring with the required characteristics, it is necessary to modify the face of the brake shoes with a clearance slot so that the spring hooks can engage the spring support pins upon assembly without interference from the brake shoe face. Using this technique, the brake spring support pins can be located closer to the interface of the brake shoes thus allowing for the maximum length return spring possible. Difficulty arises when the brake spring is assembled onto the brake spring support pins since the working area has been reduced which results in difficulty in using traditional tools and techniques to assemble the brake.

Also, current manufacturing techniques require that the mounting bolts securing the brake assembly to the inner support flange be tightened. The two mounting bolts that mount the S-cam are tightened after assembly of the brake return spring onto the spring support pins. The structure and operation of an "S-cam" brake is described in U.S. Pat. No. 4,476,968, the disclosure of which is hereby incorporated by reference. Prior art brakes are sufficiently large so that the tightening of these S-cam mounting bolts is not a problem by simply deflecting the spring coils, a wrench can engage the mounting bolts for tightening. Once the overall brake envelope has been reduced, the return spring coil packs are directly over the S-cam mounting bolts making tightening of the mounting bolts most impossible. Thus, it would be desirable to have an easy method of engaging the return springs on the return spring support pins after the brakes have been mounted to the S-cam actuation assembly.

SUMMARY OF THE INVENTION

The return spring support pin of the present invention allows for the easy assembly of the return spring onto the return spring support pins using conventional tools. This allows for a tightening of the S-cam actuation assembly prior to installation of the return spring although the present invention is useful for any type of brake activation system. An ordinary mechanical tool can be used to rotate the return spring support pin of the present invention such that a protruding cam portion engages the spring hook and as the cam or the pin is rotated, the cam displaces and stretches the spring such that the hook portion clears the main body of the spring support pin and then allows the spring hook to engage the pin in a conventional fashion. Grooves in the cam portion and on the spring support pin provide for accurate placement and retention of the spring hook as it is being stretched and displaced over the spring support pin and for normal operation thereafter.

One provision of the present invention is to allow for the easy assembly of a brake return spring onto a spring support pin.

Another provision of the present invention is to allow for ease of assembly of the brake spring onto a spring support pin using a pin having a protruding cam portion which is rotated through a range of travel.

Still another provision of the present invention is to provide for the ease of assembly of a brake return spring onto a spring support pin having a protruding cam portion which engages the spring hook and stretches and with rotation stretches and translates the spring hook into a position so as to engage the spring support pin allowing for assembly subsequent to the mounting of the brake shoes.

BRIEF DESCRIPTION OF THE DRAWINGS

FIG. 1 is a cross-sectional view of a prior art brake shoe assembly;

FIG. 2 is a cross-sectional view of the upper end of a brake shoe showing the spring support pin of the present invention as it just engages the spring hook portion of the brake return spring;

FIG. 3 is a cross-sectional view of a portion of a brake shoe showing the spring support pin of the present invention as it is rotated to a position maximizing the extension of the brake return spring;

FIG. 4 is a sectional view of a portion of the brake shoe assembly showing the brake spring support pin of the present invention taken along line IV—IV;

FIG. 5 is a cross-sectional view of a portion of a brake shoe assembly showing the spring support pin of the present invention rotated such that the spring hook has fully engaged the spring support pin;

FIG. 6 is a cross-sectional view of the spring support pin of the present invention; and FIG. 7 is an in-view of an alternate embodiment of the spring support pin of the present invention.

DESCRIPTION OF THE PREFERRED EMBODIMENTS

Referring to FIG. 1, prior art brake assembly 2 is shown mounted to circle a vehicle axle 4 having a right brake shoe 6 and a left brake shoe 7. The right brake shoe 6 and the left brake shoe 7 are made up of brake shoe webs 12 and 13 which are attached to and support a right shoe face 8 and a left shoe face 9 respectively. The right shoe face 8 serves to and is attached to a right brake pad which is shown as having two portions, an upper and a lower. The brake shoe webs meet and are supported by a lower shoe pin 18 and freely rotates thereon and where the brake web upper portion is supported and freely rotates on a left upper pin 20 and a right upper pin 22. The left upper pin 20 and the right upper pin 22 can consist of rollers which allow for the free motion of an actuator cam 24 which rotates about its center 25 causing the left upper pin 20 and the right upper pin 22 to be increased in dimensional separation which increases the distance between the right brake pad 10 and the left brake pad 14. As the right brake pad 10 and the left brake pad 14 expand in diametrical dimension, they come in contact with a frictional surface of a brake drum causing a retarding force being imparted to the vehicle wheel which is not shown.

To retain the right brake shoe 6 and the left brake shoe 7 so that they are forced together and maintain contact with the left upper pin 20 and the right upper pin 22, a brake shoe 26 is used which is attached to the left spring pin 28 and which is supported by the left brake shoe web 12 and a right spring pin 30 which is supported by the right shoe web 13. The brake spring 26 is attached to the left spring pin by the left spring hook 32 which partially encircles and is supported by left spring pin 28. Likewise, the opposite side of the brake spring 26 is supported by the right spring pin 30 which is partially encircled by the right spring hook 34.

In this position, the brake spring is loaded under tension which tends to draw the left spring pin 28 towards the right spring pin 30. Upon rotation of the actuator cam 24, the distance separating the left brake pad 10 from the right brake pad 14 is increased thereby increasing the linear distance between the left spring pin 28 and the right spring pin 30 stretching and increasing the tension force contained in the brake spring 26.

Now referring to FIG. 2, a portion of the left brake shoe 6 is shown where the spring support pin 28 of the prior art has been replaced with a cam spring pin 29 which has a raised portion identified as the spring cam 39 which is shown as it engages the left spring hook 32 as an initial step to the full extension and installation of the brake spring 26 onto the cam spring pin 29.

To provide for clearance of the left spring hook 32 as it engages and is moved by the spring cam 39 a shoe face is used which is a slot cut into the left shoe face 8.

For installation of the brake spring 26 onto the cam spring pin 29, the cam spring pin is rotated in a clockwise direction as shown by the arrow in FIG. 2. The left spring hook 32 is shown prior to extension of the brake spring 26 and is positioned to engage one side of the spring cam 39. The cam spring pin 29 is then rotated in a clockwise direction to an intermediate position as that shown in FIG. 3.

Now referring to FIG. 3, a portion of the right brake shoe 6 is shown with the cam spring pin 29 rotated in a clockwise direction so as to position the spring cam directly opposite the spring support pin 30 thereby extending the brake spring into tension and moving the left spring hook 32 through the shoe face opening 38. A sectional view of the cam spring pin 29 taken along line IV—IV is shown in FIG. 4. In this view, the almost identical left shoe webs 12A and 12B are shown which have holes extending therethrough for support and rotation of the cam spring pin 29. The cam spring pin 29 of the present invention is shown in the same position as shown in FIG. 3 where the left spring hook 32 is supported by the spring cam 39 which is attached and made part of the cam spring pin 29. Also shown is a series of pin splines 40 which are used to rotate using a mechanical device, the pin splines 40 are engaged and used to cause the cam spring pin 29 to rotate in a clockwise direction for assembling the brake spring 26 and in a counterclockwise direction to disassembly the brake spring 26.

Also clearly shown in FIG. 4 is the function of the shoe face opening 38 which allows for the left spring hook 32 to clear the left shoe face 8 and facilitate the fitting of the longest possible spring between the left brake shoe 6 and the right brake shoe 7 for obtaining the best possible load characteristics while minimizing stress levels in the brake spring 26.

Now referring to FIG. 5, the cam spring pin 29 of the present invention has been rotated further clockwise so that the spring cam 39 no longer engages the left spring hook 32 and where the left spring hook 32 now is supported on the cam spring pin 29 at a depressed area which is slightly smaller in diameter than the rest of the cam spring pin 29 and forms a spring groove 42.

To disengage the left spring hook 32 from the cam spring pin 29, the cam spring pin 29 is rotated in a counterclockwise direction so as to engage the spring cam 39 at its disassembly opposite face at the end of the left spring hook 32 where the motion of the cam spring pin 29 is reversed and again stretches and displaces the brake spring 26 at positions shown in FIG. 5, FIG. 3 and FIG. 2 in an opposite sequence from that for assembly.

Now referring to FIG. 6, an alternate embodiment of the cam spring pin 29' is shown where the spring cam 39' is joined to the pin body 31' and forms one piece. The spring cam 39' has a depression in its outermost face known as a tab spring groove 44 which serves to better locate the brake spring 26 at the left spring hook 32 so that it remains centered as it is assembled or disassembled from the cam spring pin 29'.

Rotation is accomplished by engagement of the pin hex 41 which is shaped to fit an ordinary socket used to rotate the pin body 31' along with the cam spring pin 29'. Also shown is a partial spring groove which can extend to completely surround the circumference of the pin body 31' or can be confined to that portion that engages the left spring hook 32 when fully assembled.

FIG. 7 shows a second alternate embodiment of the cam spring pin 29'' as an invention where a rod-shaped spring cam 39'' is shown attached to the pin body 31''. The spring groove 42 is shown as only partially extending around the circumference of the pin body 31'' but could extend to any point along the circumference. By using the rod-shaped spring cam 39'', the smooth rotation of the cam spring pin 29'' of the present invention is facilitated while allowing for good retention of the left spring hook 32 as the brake spring 26 is assembled or disassembled from the cam spring pin 29''. Various alternate shapes and configurations could be used for the spring cam 39 while remaining within the spirit of the invention.

In this disclosure, references made to both left and right components where either left or right could be used interchangeably and no limitations are intended.

It will be appreciated by those of ordinary skill in the art that many variations in the foregoing preferred embodiments are possible while remaining within the scope of the present invention. The present invention should thus not be considered limited in the preferred embodiments or the specific choices of materials, configurations, dimensions, application or ranges of parameters employed therein.

What is claimed is:

1. A brake shoe return system comprising:
   a spring support pin having a substantially cylindrical body rotationally supported by said brake shoe;
   a spring cam radially and axially extending from and attached to said spring support pin;
   a brake shoe rotationally supporting said spring support pin; and
   a brake spring having at least one spring hook for engaging said spring support pin, said spring hook having an end for placement on said spring support pin where said spring hook is placed on said spring support pin by engaging said end onto said spring cam at a position where said spring cam is joined to said spring support pin as said spring support pin is rotated thereby extending said brake spring and where said spring cam then disengages said brake spring where said brake spring is supported on said spring support pin by said spring hook.

2. The brake shoe return system of claim 1, wherein said spring support pin is grooved at the point where said spring hook engages said spring support pin.

3. The brake shoe return system of claim 1, wherein said spring cam is generally cylindrical in shape.

4. The brake shoe return system of claim 1, where said spring cam has a diameter smaller than the diameter of said spring support pin, said spring cam having a central axis substantially parallel to the central axis of said spring support pin.

5. A brake shoe return system comprising:
   a spring support pin having a substantially cylindrical body rotationally supported by a brake shoe;
   a spring cam radially and axially extending from and attached to said spring support pin; and
   a brake spring having at least one spring hook for engaging said spring support pin, said spring hook having an end for placement on said spring support pin where said spring hook is placed on said spring support pin by engaging said end onto said spring cam at a position where said spring cam is joined to said spring support pin where said spring support pin is rotated thereby causing said spring hook to engage said spring cam thereby extending said brake spring and where said spring cam then disengages said brake spring where said brake spring is supported on said spring support pin by said spring hook.

6. The brake shoe return system of claim 5, wherein said spring support pin is grooved at the point where said spring hook engages said spring support pin.

7. The brake shoe return system of claim 5, wherein said spring cam is generally cylindrical in shape.

8. The brake shoe return system of claim 5, where said spring cam has a diameter smaller than the diameter of said spring support pin, said spring cam having a central axis substantially parallel to the central axis of said spring support pin.

* * * * *